(12) United States Patent
Clinch et al.

(10) Patent No.: US 6,979,158 B2
(45) Date of Patent: Dec. 27, 2005

(54) CAGE NUT ASSEMBLY HAVING A STAND-OFF NUT

(75) Inventors: James Patrick Clinch, Sterling Heights, MI (US); Paul Douglas Purdy, Holly, MI (US); James Ray Berkshire, Logansport, IN (US)

(73) Assignee: Textron Inc., Providence, RI (US)

( * ) Notice: Subject to any disclaimer, the term of this patent is extended or adjusted under 35 U.S.C. 154(b) by 83 days.

(21) Appl. No.: 10/619,340

(22) Filed: Jul. 14, 2003

(65) Prior Publication Data

US 2004/0013492 A1 Jan. 22, 2004

Related U.S. Application Data

(60) Provisional application No. 60/396,268, filed on Jul. 16, 2002.

(51) Int. Cl.[7] .............................................. F16B 39/284
(52) U.S. Cl. ...................... 411/112; 411/111; 411/171; 411/184; 411/187
(58) Field of Search ................. 411/111, 112, 171, 411/184–187

(56) References Cited

U.S. PATENT DOCUMENTS

| | | | |
|---|---|---|---|
| 2,567,864 A | * | 9/1951 | Becker .................. 411/112 |
| 2,649,883 A | | 8/1953 | Sharp |
| 2,695,046 A | | 11/1954 | Tinnerman, III |
| 2,867,259 A | | 1/1959 | Barron |
| 2,875,805 A | | 3/1959 | Flora |
| 3,025,897 A | | 3/1962 | Gieleghem |
| 3,177,916 A | | 4/1965 | Rosan |
| 3,556,570 A | | 1/1971 | Cosenza |
| 3,670,796 A | | 6/1972 | Grimm |
| 3,695,324 A | | 10/1972 | Gulistan |
| 3,765,078 A | | 10/1973 | Gulistan |
| 3,785,421 A | | 1/1974 | Launay |
| 4,186,787 A | | 2/1980 | Hussain |
| 4,193,435 A | | 3/1980 | Frosch et al. |
| 4,263,831 A | * | 4/1981 | Smith .................. 411/171 |
| 4,557,650 A | | 12/1985 | Molina |
| 4,732,518 A | | 3/1988 | Toosky |
| 4,741,654 A | * | 5/1988 | Lovisek .................. 411/186 |
| 4,762,451 A | | 8/1988 | Collins |
| 4,793,757 A | * | 12/1988 | Peterson .................. 411/533 |

(Continued)

FOREIGN PATENT DOCUMENTS

| | | | | |
|---|---|---|---|---|
| DE | 1055718 | | 4/1959 | |
| JP | 08114213 A | * | 5/1996 | ........... F16B/35/00 |

*Primary Examiner*—Robert J. Sandy
*Assistant Examiner*—Katherine Mitchell
(74) *Attorney, Agent, or Firm*—Trexler, Bushnell, Giangiorgi, Blackstone & Marr, Ltd.

(57) ABSTRACT

A cage nut assembly includes a nut and a cage wrapped therearound. The nut has a number of stand-offs or protrusions provided on a lower surface thereof such that the stand-offs are the only part of the nut which are in contact with the cage. The stand-offs reduce the amount of bearing surface interface between the cage and the nut thus reducing the possibility that the two parts will stick to each other after a coating is applied to the mating surface which the cage is welded to. The nut is engaged by a male threaded fastener which is torqued into place and the stand-offs push into the material of the cage causing the cage material to flow out of the way such that the stand-offs embed into the material of the cage without deforming the stand-offs to a flattened condition.

22 Claims, 6 Drawing Sheets

U.S. PATENT DOCUMENTS

| | | |
|---|---|---|
| 5,028,189 A | 7/1991 | Harley |
| 5,066,180 A | 11/1991 | Lang et al. |
| 5,074,727 A | 12/1991 | Wentzel |
| 5,096,349 A | 3/1992 | Landy et al. |
| 5,096,350 A | 3/1992 | Peterson |
| 5,137,406 A * | 8/1992 | Cosenza .................... 411/113 |
| 5,245,743 A | 9/1993 | Landy et al. |
| 5,380,136 A | 1/1995 | Copple et al. |
| 5,405,228 A | 4/1995 | Reid et al. |
| 5,468,104 A | 11/1995 | Reid et al. |
| 5,630,686 A | 5/1997 | Billmann |
| 5,704,747 A | 1/1998 | Hutter, III et al. |
| 5,746,561 A | 5/1998 | Nygren, Jr. et al. |
| 5,797,581 A | 8/1998 | Sherman |
| 5,893,694 A | 4/1999 | Wilusz et al. |
| 6,077,010 A | 6/2000 | Reid et al. |
| 6,146,071 A | 11/2000 | Norkus et al. |
| 6,183,180 B1 | 2/2001 | Copple et al. |
| 2002/0136617 A1 * | 9/2002 | Imahigashi .................. 411/533 |
| 2003/0147715 A1 * | 8/2003 | Curley et al. ................ 411/111 |

* cited by examiner

US 6,979,158 B2

CAGE NUT ASSEMBLY HAVING A STAND-OFF NUT

CROSS-REFERENCE

This patent application claims the benefit of domestic priority of U.S. Provisional Application Ser. No. 60/396,268, filed Jul. 16, 2002, and entitled "Cage Nut Assembly Having A Stand-Off Nut".

BACKGROUND OF THE INVENTION

The present invention relates to a cage nut assembly.

Cage nut assemblies are well known in the art and provide a useful function in that they are able to hold a threaded nut at locations in a frame that are difficult or in some cases impossible to reach with a tool. Cage nut assemblies are used in vehicles for seat attachments, radiator attachments, chassis to drive train attachments, and for any other nut application that requires the nut to have an "X" and "Y" axis adjustability to accommodate tolerance variations and enable engagement thereof by a male threaded fastener.

Problems have arisen in conjunction with prior art cage nut assemblies. One problem occurs after the cages of the cage nut assemblies are welded to a mating surface, such as an automobile frame. After the cages are welded to the automobile frame, the frames are sent through an e-coat or ELPO bath that adds a corrosion or paint coating to thereto. In cage nut assemblies where the underside of the nut is capable of sitting flat on the cage, the nut and cage may stick together when the e-coat or ELPO bath is applied thereto, thus removing the intended float/adjustability of the nut within the cage.

Two separate United States patents have acknowledged this problem and have attempted to provide cage nut assemblies which solve the problem. U.S. Pat. No. 5,096,350 discusses the use of any item attached to either the cage or the nut, or to a third part positioned between the nut and the cage, that flattens out when the nut is torqued into place. This item allows for the stand-off needed during the e-coat and provides for a solid joint when the nut is torqued into place. These flattenable projections either on the cage or the nut, or the addition of a third part with the flattenable projections thereon, provide high manufacturing costs to the cage nut assembly.

U.S. Pat. No. 5,630,686 discusses the use of plastic rings staked at the top of a nut extrusion that hold the nut up off of the cage floor or mating panel, thus removing the possibility that the e-coat will allow the parts to stick together. The plastic rings are flexible enough to allow a solid joint to take place when the nut is lowered to interface with the cage floor or mating panel when the nut is torqued down. This patent requires the plastic rings in order to perform the desired function. The addition of the plastic rings to the cage nut assembly is expensive and the rings sometimes disengage from the assembly when the nut is torqued into place thus causing a buzz, squeak rattle ("BSR") issue with customers.

Thus, there is a need for a cage nut assembly which does not allow the nut to become stuck to the cage during the application of an e-coat or ELPO bath and which overcomes the disadvantages of the aforementioned United States patents which have attempted to solve this same problem.

OBJECTS AND SUMMARY

A primary object of an embodiment of the present invention is to provide a cage nut assembly which reduces the possibility of the nut sticking to the cage when an e-coat or ELPO bath is applied thereto.

Another object of an embodiment of the present invention is to provide a cage nut assembly that has strong joints between the nuts and the cages after the nuts are torqued into place.

Yet another object of an embodiment of the present invention is to provide stand-off features on the nut which will reduce the amount of bearing surface interface between the cage and nut, before the nuts are torqued down.

Another object of an embodiment of the present invention is to provide a cage nut assembly where the nut is allowed to float within the cage after coating of the mating surface, which the cage is attached to.

Still another object of an embodiment of the present invention is to provide a cage nut assembly which requires less manufacturing costs in comparison to cage nut assemblies of the prior art.

An object of an embodiment of the present invention is to provide a cage nut assembly having a nut which is made of a harder material than a cage thereof such that the nut can push into the material of the cage, causing it to flow out of the way to allow the nut to embed itself into the cage.

Briefly, and in accordance with the foregoing, the present invention provides a cage nut assembly having a nut and a cage. The nut is positioned within the cage such that stand-offs at the corners of the base of the nut, in the first preferred embodiment, or rounded beads extending between the corners of the base of the nut and an aperture in the middle of the base of the nut, in the second preferred embodiment, are the only parts of the nut which are in contact with the cage such that a gap is provided therebetween. Of course these stand-offs could also be in the form of three or more dimples on the nut, or any such solid (un-flexing) configuration that allows for reduced surface to surface contact between the nut and cage prior to torqueing of the nut. Arm portions of the cage are bent around the nut such that a cylindrical member of the nut extends through semicircular cutouts of the arm portions in order to effectively encage the nut within the cage. The cage is sized so that the nut has a limited range of movement in at least one direction.

Once the cage nut assembly is formed, the cage is welded to a mating surface. The mating surface is then sent through an e-coat or ELPO bath. The stand-offs keep the nut from sitting flat on the cage, thus reducing the amount of bearing surface interface between the cage and the nut such that the possibility of the nut and cage sticking to each other after the coating is applied. The nut is then torqued into place within the cage and the stand-offs push into the material of the cage, as they are formed of a harder material, causing the material of the cage to flow out of the way such that the stand-offs embed into the cage without deforming the stand-offs to a flattened condition.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE ILLUSTRATED EMBODIMENT

Figure 1:
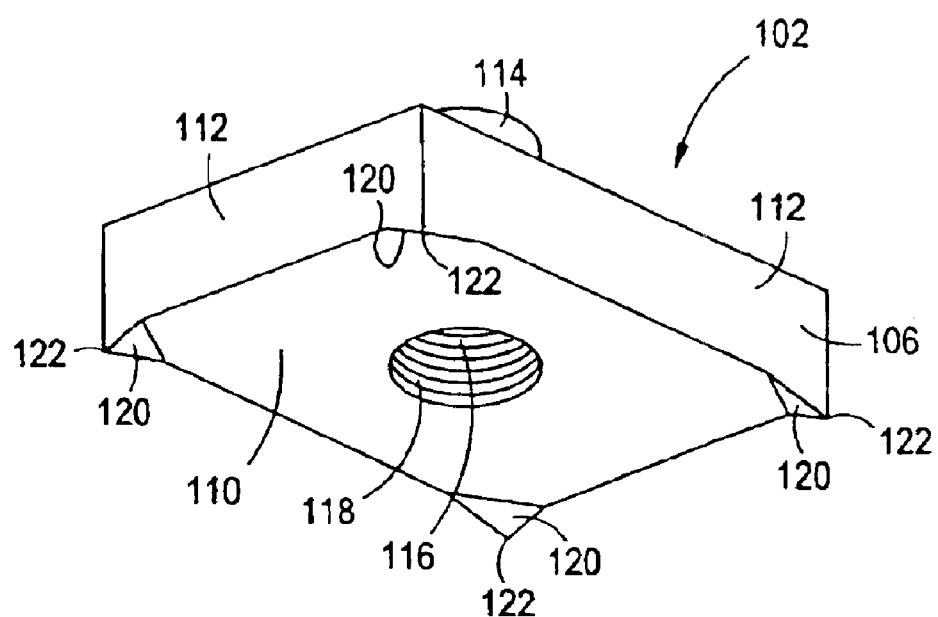
FIG. 1 is a perspective view of a nut of a first embodiment of the invention.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated.

A first embodiment of the cage nut assembly 100 is shown in FIGS. 1–6. A second embodiment of the cage nut assembly 200 is shown in FIGS. 7–12. Like elements are denoted with like reference numerals with the first embodiment being in the one hundreds and the second embodiment being in the two hundreds.

Attention is directed to a first embodiment of a cage nut assembly 100 of the present invention, which is best illustrated in FIGS. 1–6. The cage nut assembly 100 includes a nut 102 and a cage 104.

The nut 102 is best illustrated in FIG. 1 and includes a rectangular plate 106 having a generally planar upper surface 108, a generally planar lower surface 110 and sidewalls 112 which connect the upper and lower surfaces 108, 110. The nut 102 also includes a cylindrical member 114 which extends outwardly from the upper surface 108 of the nut 102. The cylindrical member 114 is preferably in the form of a right circular cylinder. An aperture 116 extends through the nut member 102 from the plate 106 into the cylindrical member 114. The aperture 116 may be closed at the lower surface 110 of the plate 106 or it may extend all the way through the plate 106. The aperture 116 defines an aperture wall 118 which is preferably threaded and is capable of receiving a bolt or screw 160 to be attached thereto.

The nut 102 also preferably includes four stand-offs or protrusions 120 which extend outwardly from the lower surface 110 of the nut 102. Each stand-off or protrusion 120 extends outwardly from one of the four corners of the lower surface 110 of the nut 102. Each stand-off or protrusion 120 is also preferably in the form of a tetrahedron such that each of the stand-offs or protrusions 120 extends generally to a pointed portion 122 thereof. Of course, the stand-offs or protrusions 120 may be in forms other than of a tetrahedron, such as dimples, ribs, or any other type of protrusion, so long as the protrusions allow for reduced surface to surface contact between the nut 102 and the cage 104 prior to the torqueing of the nut 102.

The nut 102 may be formed by cold forming, stamping, or staking a nut member into a plate member. The nut 102 may then be heat treated, if desired, depending on the hardness of the material of the nut 102.

The cage 104 is used for encaging the nut 102. Prior to encaging the nut 102, the cage 104 has generally planar upper and lower surfaces 124, 126. The cage 104 includes a base portion 128 and bendable first and second arm portions 130, 132 extending from opposite ends of the base portion 128. The first and second arm portions 130, 132 are preferably integrally formed with the base portion 128.

Figure 6:
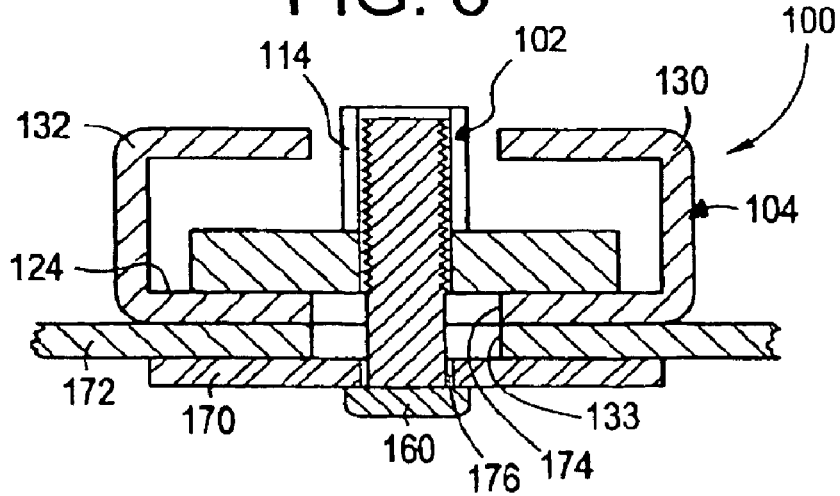
FIG. 6 is a cross-sectional side elevational view of the cage nut assembly of the first embodiment of the invention taken along line 6—6 of FIG. 3, after the nut is torqued into place, with the nut securing a structural member and a seat attachment member to the cage nut assembly.

An aperture 133, see FIG. 6, is provided through the base portion 128 of the cage 104 and the first and second arm portions 130, 132 have generally semicircular cutouts 134, 136 at their free ends 138, 140.

The cage 104 is formed of material which is softer than the material of the nut 102.

Figure 2:
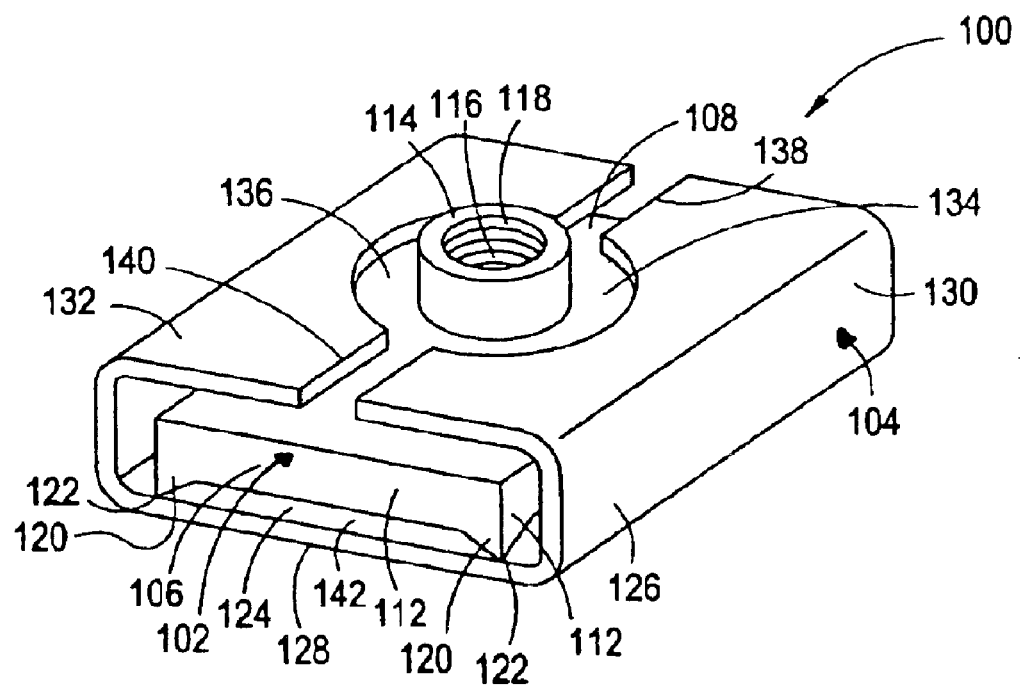
FIG. 2 is a perspective view of a cage nut assembly of the first embodiment of the invention.
Figure 3:
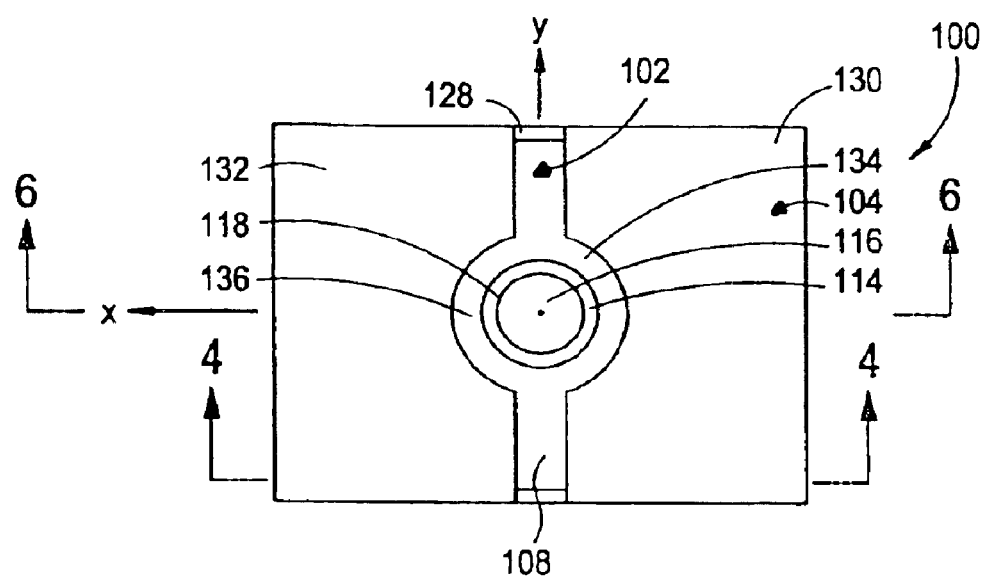
FIG. 3 is a top plan view of the cage nut assembly of the first embodiment of the invention.
Figure 4:
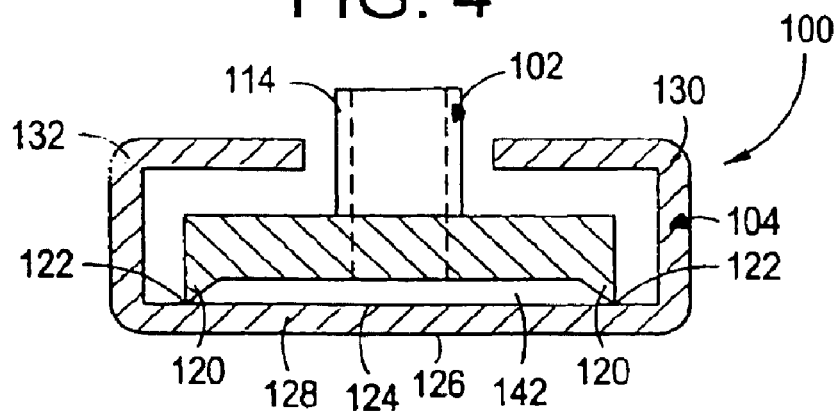
FIG. 4 is a cross-sectional side elevational view of the cage nut assembly of the first embodiment of the invention taken along line 4—4 of FIG. 3, prior to the nut being torqued into place.

In operation, and as best illustrated in FIGS. 2–4, the nut 102 is positioned on the upper surface 124 of the base portion 128 such that the points 122 of the stand-offs or protrusions 120 are the only parts of the nut 102 which are in contact with the upper surface 124 of the base portion 128. Thus, a gap 142 is provided between the upper surface 124 of the base portion 128 of the cage 104 and the lower surface 110 of the nut 102.

Each of the arm portions 130, 132 is then bent around one of the sidewalls 112 of the nut 102 and above the upper surface 108 of the nut 102. The free ends 138, 140 of the arm portions 130, 132 are typically spaced apart and the semicircular cutouts 134, 136 are in alignment with one another. The aperture 133 preferably has a diameter which is greater than or equal to a diameter of the semicircular cutouts 134, 136. The cylindrical member 114 of the nut 102 extends through the semicircular cutouts 134, 136. Thus, the cage 104 effectively encages the nut 102 to form the cage nut assembly 100, which is best illustrated in FIGS. 2–4. The cage 104 is sized so that the nut 102 has a limited range of movement in at least one dimension, and preferably in two dimensions, for example the "X" and "Y" axes as illustrated in FIG. 3.

Figure 5:
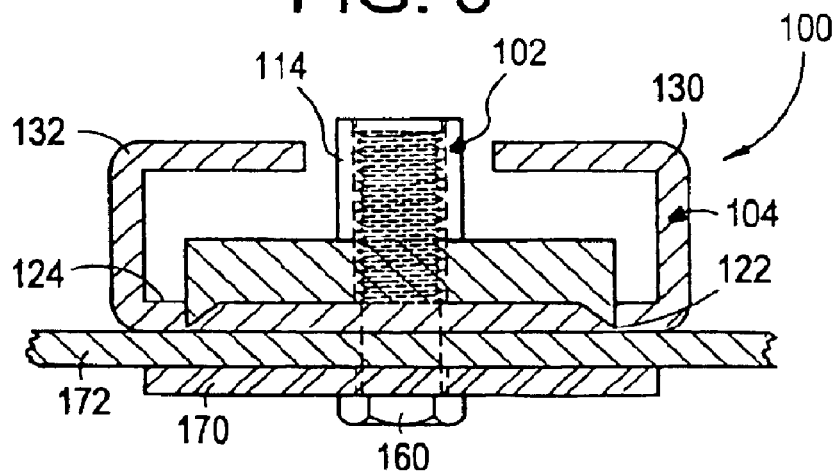
FIG. 5 is a cross-sectional side elevational view of the cage nut assembly of the first embodiment of the invention taken along line 4—4 of FIG. 3, after the nut is torqued into place, with the nut securing a structural member and a seat attachment member to the cage nut assembly.

The lower surface 126 of the base portion 128 of the cage 104 is then welded to a mating surface or structural member 172, such as an automobile frame, see FIGS. 5 and 6. The structural member 172 has an aperture 174 therethrough which is in alignment with the aperture 133 of the cage 104. The aperture 174 preferably has a diameter which is greater than or equal to the diameter of the aperture 133. The structural member 172 and the cage 104 are then typically sent through an e-coat or ELPO bath that is meant to add a corrosion or paint coating to the structural member 172. The stand-offs or protrusions 120 keep the lower surface 110 of the nut 102 from sitting flat on the upper surface 124 of the base portion 128 of the cage 104, thus reducing the amount of bearing surface interface between the cage 104 and the nut 102, thus reducing the possibility that the cage 104 and the nut 102 will stick or adhere to each other after coating or welding is complete.

The nut 102 is engaged by a male threaded fastener 160 in the form of a bolt or screw which is torqued into place within the cage 104. The fastener 160 extends through an aperture 176 of a member 170, positioned against the structural member 172, through the aperture 174 of the structural member 172, through the aperture 133 of the cage 104, and into the aperture 116 of the nut 102. The fastener 160 engages the aperture wall 118 of the aperture 116. The cage 104 prevents the nut 102 from turning to permit full engagement of the male fastener (not shown). The stand-offs or protrusions 120, being formed of a material which is harder than the material of the cage 104, push into the material of the cage 104. This causes the material of the cage 104 to flow out of the way such that the stand-offs or protrusions 120 embed into the softer material of the cage 104 without deforming the stand-offs or protrusions 120 to a flattened condition, as best illustrated in FIGS. 5 and 6. It should be noted that in practice the male fastener 160 is engaged with nut 102 to attain the condition as illustrated in FIGS. 5 and 6. The gap 142 between the upper surface 124 of the base portion 128 of the cage 104 and the lower surface 110 of the nut 102, as illustrated in FIGS. 2 and 4, is entirely removed, or is minimal, after the torqueing of the nut 102 such that a solid joint between the male fastener 160 and the nut 102 and the cage 104 is attained. Whether the gap 142 is entirely removed or is minimal after the torqueing of the nut 102 is a function of the hardness of the cage 104 relative to the hardness of the nut 102 as well as a function of how tight the male fastener 160 is engaged with the nut 102.

Attention is directed to a second embodiment of a cage nut assembly 200 of the present invention, which is best illustrated in FIGS. 7–12. The cage nut assembly 200 includes a nut 202 and a cage 204.

Figure 7:
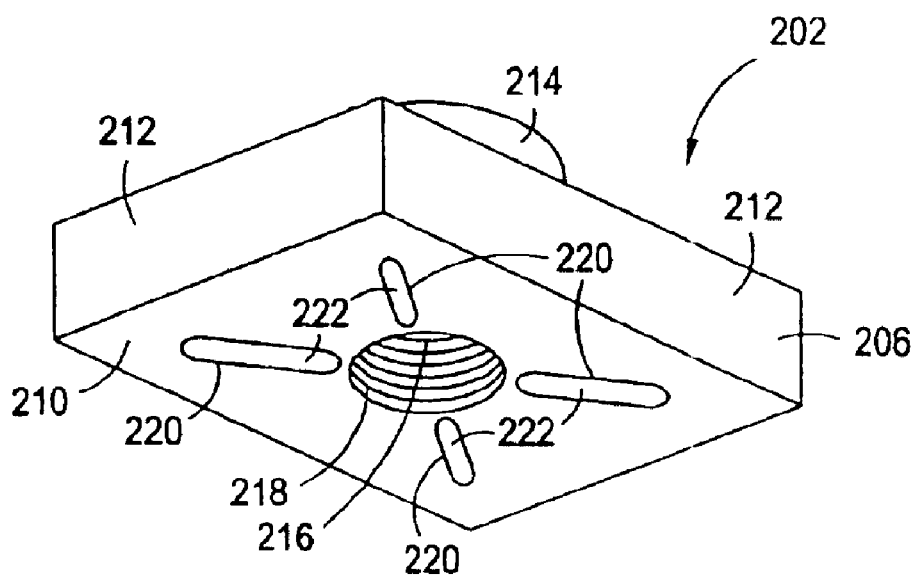
FIG. 7 is a perspective view of a nut of a second embodiment of the invention.

The nut 202 is best illustrated in FIG. 7 and includes a rectangular plate 206 having a generally planar upper surface 208, a generally planar lower surface 210 and sidewalls 212 which connect the upper and lower surfaces 208, 210. The nut 202 also includes a cylindrical member 214 which extends outwardly from the upper surface 208 of the nut 202. The cylindrical member 214 is preferably in the form of a right circular cylinder. An aperture 216 extends through the nut member 202 from the plate 206 into the cylindrical member 214. The aperture 216 maybe closed at the lower surface 210 of the plate 206 or it may extend all the way through the plate 206. The aperture 216 defines an aperture wall 218 which is preferably threaded and is capable of receiving a bolt or screw 260 to be attached thereto.

The nut 202 also preferably includes four stand-offs or protrusions 220 which extend outwardly from the lower surface 210 of the nut 202. Each stand-off or protrusion 220 extends a portion of a distance between the aperture 216 and one of the four corners of the lower surface 210 of the nut 202. Each stand-off or protrusion 220 is also preferably in the form of a rounded bead such that each of the stand-offs or protrusions 220 extends to a tangential point or line 222 thereof. Of course, the stand-offs or protrusions 220 may be in forms other than of rounded beads, such as dimples, ribs, or any other type of protrusion, so long as the protrusions allow for reduced surface to surface contact between the nut 202 and the cage 204 prior to the torqueing of the nut 202.

The nut 202 may be formed by cold forming, stamping, or staking a nut member into a plate member. The nut 202 may then be heat treated, if desired, depending on the hardness of the material of the nut 202.

The cage 204 is used for encaging the nut 202. Prior to encaging the nut 202, the cage 204 has generally planar upper and lower surfaces 224, 226. The cage 204 includes a base portion 228 and bendable first and second arm portions 230, 232 extending from opposite ends of the base portion 228. The first and second arm portions 230, 232 are preferably integrally formed with the base portion 228.

Figure 12:
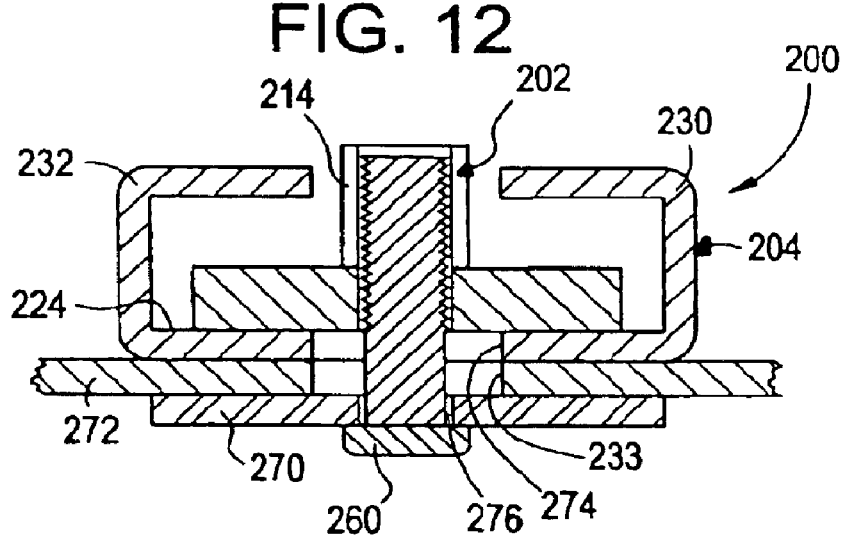
FIG. 12 is a cross-sectional side elevational view of the cage nut assembly of the second embodiment of the invention taken along line 12—12 of FIG. 9, after the nut is torqued into place, with the nut securing a structural member and a seat attachment member to the cage nut assembly.

An aperture 233, see FIG. 12, is provided through the base portion 228 of the cage 204 and the first and second arm portions 230, 232 have generally semicircular cutouts 234, 236 at their free ends 238, 240.

The cage 204 is formed of material which is softer than the material of the nut 202.

Figure 8:
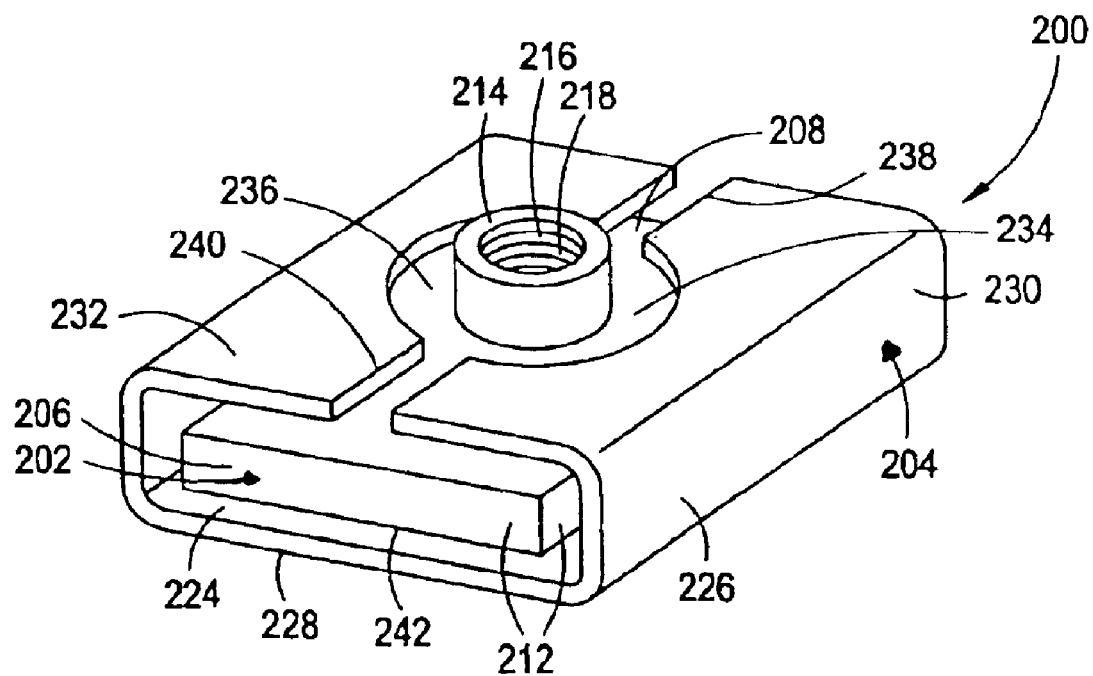
FIG. 8 is a perspective view of a cage nut assembly of the second embodiment of the invention.
Figure 9:
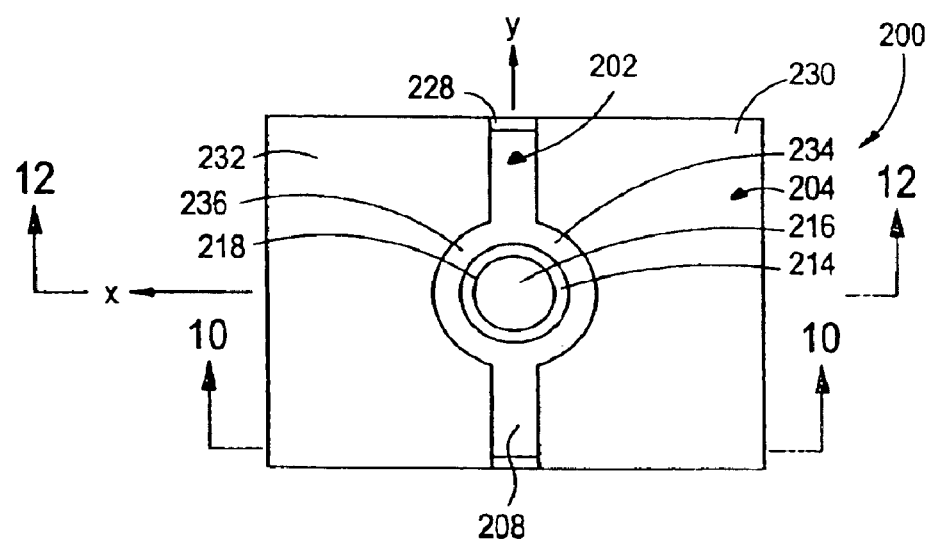
FIG. 9 is a top plan view of the cage nut assembly of the second embodiment of the invention.
Figure 10:
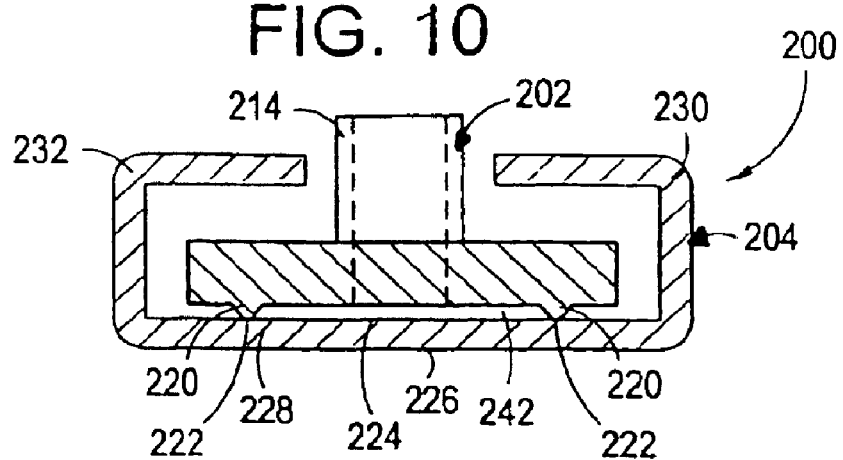
FIG. 10 is a cross-sectional side elevational view of the cage nut assembly of the second embodiment of the invention taken along line 10—10 of FIG. 9, prior to the nut being torqued into place.

In operation, and as best illustrated in FIGS. 8–10, the nut 202 is positioned on the upper surface 224 of the base portion 228 such that the tangential points or lines 222 of the stand-offs or protrusions 220 are the only parts of the nut 202 which are in contact with the upper surface 224 of the base portion 228. Thus, a gap 242 is provided between the upper surface 224 of the base portion 228 of the cage 204 and the lower surface 210 of the nut 202.

Each of the arm portions 230, 232 is then bent around one of the sidewalls 212 of the nut 202 and above the upper surface 208 of the nut 202. The free ends 238, 240 of the arm portions 230, 232 are typically spaced apart and the semicircular cutouts 234, 236 are in alignment with one another. The aperture 233 preferably has a diameter which is greater than or equal to a diameter of the semicircular cutouts 234, 236. The cylindrical member 214 of the nut 202 extends through the semicircular cutouts 234, 236. Thus, the cage 204 effectively encages the nut 202 to form the cage nut assembly 200, as best illustrated in FIGS. 8–10. The cage 204 is sized so that the nut 202 has a limited range of movement in at least one dimension, and preferably in two dimensions, for example the "X" and "Y" axes as illustrated in FIG. 9.

Figure 11:
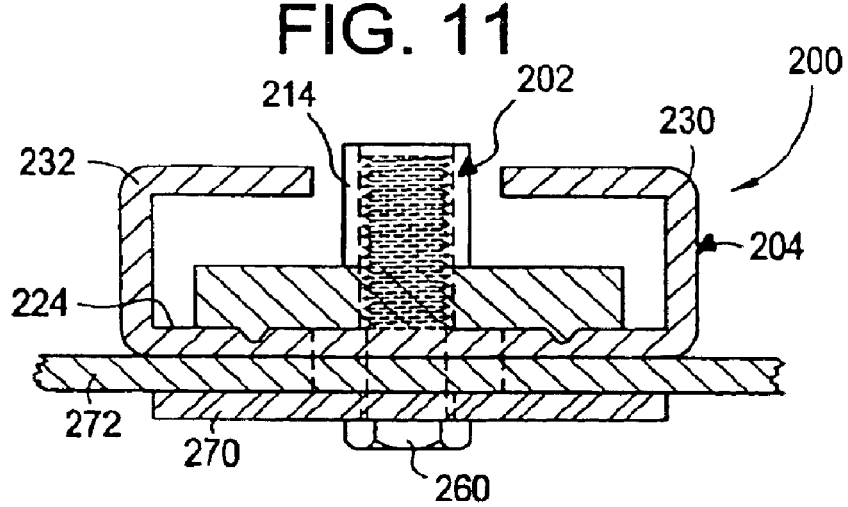
FIG. 11 is a cross-sectional side elevational view of the cage nut assembly of the second embodiment of the invention taken along line 10—10 of FIG. 9, after the nut is torqued into place, with the nut securing a structural member and a seat attachment member to the cage nut assembly.

The lower surface 226 of the base portion 228 of the cage 204 is then welded to a mating surface or structural member 272, such as an automobile frame, see FIGS. 11 and 12. The structural member 272 has an aperture 274 therethrough which is in alignment with the aperture 233 of the cage 204. The aperture 274 preferably has a diameter which is greater than or equal to the diameter of the aperture 233. The structural member 272 and the cage 204 are then typically sent through an e-coat or ELPO bath that is meant to add a corrosion or paint coating to the structural member 272. The stand-offs or protrusions 220 keep the lower surface 210 of the nut 202 from sitting flat on the upper surface 224 of the base portion 228 of the cage 204, thus reducing the amount of bearing surface interface between the cage 204 and the nut 202, thus reducing the possibility that the cage 204 and the nut 202 will stick to each other after coating is complete.

The nut 202 is engaged by a male threaded fastener 260 in the form of a bolt or screw which is torqued into place within the cage 204. The fastener 260 extends through an aperture 276 of a member 270, positioned against the structural member 272, through the aperture 274 of the structural member 272, through the aperture 233 of the cage 204, and into the aperture 216 of the nut 202. The fastener 260 engages the aperture wall 218 of the aperture 216. The cage 204 prevents the nut 102 from turning to permit full engagement of the male fastener (not shown). The stand-offs or protrusions 220, being formed of a material which is harder than the material of the cage 204, push into the material of the cage 204. This causes the material of the cage 204 to flow out of the way such that the stand-offs or protrusions 220 embed into the softer material of the cage 204 without deforming the stand-offs or protrusions 220 to a flattened condition, as best illustrated in FIGS. 11 and 12. It should be noted that in practice the male fastener 260 is engaged with nut 202 to attain the condition as illustrated in FIGS. 11 and 12. The gap 242 between the upper surface 224 of the base portion 228 of the cage 204 and the lower surface 210 of the nut 202, as illustrated in FIGS. 8 and 10, is entirely removed, or is minimal, after the torqueing of the nut 202 such that a solid joint between the fastener 260 and the nut 202 and the cage 204 is attained. Whether the gap 242 is entirely removed or is minimal after the torqueing of the nut 202 is a function of the hardness of the cage 204 relative to the hardness of the nut 202 as well as a function of how tight the male fastener 260 is engaged with the nut 202.

Thus, the cage nut assemblies 100, 200 provide stronger joints between the nuts 102, 202 and the cages 104, 204 than cage nut assemblies of the prior art after the nuts 102, 202 are torqued into place. The cage nut assemblies 100, 200 also require less manufacturing and provide for fewer parts than cage nut assemblies of the prior art, thus making the cage nut assemblies 100, 200 of the present invention cheaper to make. The nuts 102, 202 of the cage nut assemblies 100, 200 also effectively reduce the possibility of the nuts 102, 202 sticking to the cages 104, 204 once an e-coat or ELPO bath is applied.

While preferred embodiments of the invention are shown and described, it is envisioned that those skilled in the art may devise various modifications without departing from the spirit and scope of the foregoing description and the appended claims.

The invention is claimed as:

1. A nut member engaged within a cage member and configured to receive a fastener, said nut member comprising:
   a base portion having an upper surface, a lower surface, and at least one sidewall which connects said upper surface to said lower surface, said base portion further having at least one stand-off extending outwardly from said lower surface thereof, said at least one stand-off is configured to allow for a reduced amount of bearing surface interface between said nut member and the cage member prior to said nut member receiving the fastener, said at least one stand-off is further configured to be embedded into the cage member upon said nut member receiving the fastener, said base portion having an aperture which extends therethrough for receiving the fastener, wherein said nut member is formed of a material which is harder than a material from which the cage member is formed such that said at least one stand-off of said nut member may be embedded into the cage member upon said nut member receiving the fastener.

2. A nut member as defined in claim 1, wherein said base portion has four stand-offs extending from said lower surface thereof.

3. A nut member as defined in claim 1, wherein said at least one sidewall defines two sidewalls which are configured to meet to define a corner of said lower surface, said at least one stand-off is provided at said corner of said lower surface.

4. A nut member as defined in claim 3, wherein said base portion has four sidewalls to define four corners of said lower surface, and four stand-offs extending from said lower surface such that each stand-off extends from one of said four corners of said lower surface.

5. A nut member as defined in claim 3, wherein said at least one stand-off extends to a point.

6. A nut member as defined in claim 3, wherein said at least one stand-off is in the form of a tetrahedron.

7. A nut member as defined in claim 1, wherein said at least one sidewall defines two sidewalls which are configured to meet to define a corner of said lower surface, said at least one stand-off extends at least a portion of a distance between said aperture and said corner of said lower surface.

8. A nut member as defined in claim 7, wherein said base portion has four sidewalls to define four corners of said lower surface, and four stand-offs extending from said lower surface such that each stand-off extends at least a portion of a distance between said aperture and one of said four corners of said lower surface.

9. A nut member as defined in claim 7, wherein said at least one stand-off is in the form of a rounded bead.

10. A nut member as defined in claim 1, further comprising a cylindrical portion extending from said upper surface of said base portion.

11. A nut member as defined in claim 10, wherein said aperture of said base portion extends into said cylindrical portion.

12. An assembly configured to receive a fastener, said assembly comprising:
    a nut member having a base portion having an upper surface, a lower surface, and at least one sidewall which connects said upper surface to said lower surface, said base portion further having at least one stand-off extending outwardly from said lower surface thereof, said base portion having an aperture which extends therethrough for receiving the fastener; and
    a cage member for encaging said nut member, said cage member is configured to provide a limited range of movement of said nut member in at least one dimension, said cage member is configured to allow access to said aperture of said nut member within the limited range of movement of said nut member provided by said cage member, said at least one stand-off of said nut member is configured to allow for a reduced amount of bearing surface interface between said nut member and said cage member prior to said nut member receiving the fastener, said at least one stand-off of said nut member is further configured to be embedded into said cage member upon said nut member receiving the fastener, wherein said nut member is formed of a material which is harder than a material from which the cage member is formed such that said at least one stand-off of said nut member may be embedded into the cage member upon said nut member receiving the fastener.

13. An assembly as defined in claim 12, wherein said base portion of said nut member has four stand-offs extending from said lower surface thereof.

14. An assembly as defined in claim 12, wherein said at least one sidewall defines two sidewalls which are configured to meet to define a corner of said lower surface, said at least one stand-off is provided at said corner of said lower surface.

15. An assembly as defined in claim 12, wherein said at least one sidewall defines two sidewalls which are configured to meet to define a corner of said lower surface, said at least one stand-off extends at least a portion of a distance between said aperture and said corner of said lower surface.

16. An assembly as defined in claim 12, wherein said cage member is configured to be welded to a workpiece such that a bath can be applied to said cage member and said workpiece, said at least one stand-off assisting in preventing said nut member from being stuck to said cage member after said bath is applied thereto.

17. A combination nut member, cage member and fastener configured for interaction with a workpiece having first and second surfaces and an aperture provided therethrough, said combination comprising:

a nut member having a base portion having an upper surface, a lower surface and at least one sidewall which connects said upper surface to said lower surface, said base portion further having at least one stand-off extending from said lower surface thereof, said base portion having an aperture which extends therethrough, said aperture defining a threaded wall;

a cage member which is associated with said first surface of said workpiece, said cage member having an opening therethrough, said nut member being encaged within said cage member, said at least one stand-off of said nut member being embedded into and deforming said cage member; and a fastener having an enlarged head portion and an elongated threaded shank extending therefrom, said enlarged head portion being associated with said second surface of said workpiece, said elongated shank extending through said aperture of said workpiece and being in threaded engagement with said threaded wall of said nut member.

18. A combination as defined in claim 17, wherein said cage member is welded to said first surface of said workpiece.

19. A combination as defined in claim 17, wherein said lower surface of said base portion of said nut member is substantially positioned against said cage member.

20. A combination as defined in claim 17, wherein said at least one sidewall defines two sidewalls which are configured to meet to define a corner of said lower surface, said at least one stand-off is provided at said corner of said lower surface.

21. A combination as defined in claim 17, wherein said at least one sidewall defines two sidewalls which are configured to meet to define a corner of said lower surface, said at least one stand-off extends at least a portion of a distance between said aperture and said corner of said lower surface.

22. A combination as defined in claim 18, wherein said nut member is formed of a material which is harder than a material from which said cage member is formed such that said at least one stand-off of said nut member may be embedded into said cage member.

* * * * *